United States Patent [19]

Yamamori

[11] 4,114,169
[45] Sep. 12, 1978

[54] CAMERA WITH DATA-RECORDING STRUCTURE

[75] Inventor: Eiji Yamamori, Tokyo, Japan

[73] Assignee: Asahi Kogaku Kogyo Kabushiki Kaisha, Japan

[21] Appl. No.: 718,414

[22] Filed: Aug. 27, 1976

[30] Foreign Application Priority Data

Nov. 17, 1975 [JP] Japan .......................... 50/155231[U]

[51] Int. Cl.² ............................................. G03B 17/24
[52] U.S. Cl. .................................................... 354/106
[58] Field of Search ................ 354/105, 106, 107, 108

[56] References Cited

U.S. PATENT DOCUMENTS

| | | | |
|---|---|---|---|
| 2,490,338 | 12/1949 | Marin et al. | 354/107 |
| 3,478,657 | 11/1969 | Michels | 354/107 |
| 3,590,703 | 7/1971 | Ono | 354/106 |
| 3,733,985 | 5/1973 | Gordon | 354/107 |
| 3,812,508 | 5/1974 | Matsuda et al. | 354/106 |

FOREIGN PATENT DOCUMENTS

| | | | |
|---|---|---|---|
| 1,517,932 | 1968 | France | 354/106 |
| 13,263 | 1970 | Japan | 354/105 |

*Primary Examiner*—Donald A. Griffin
*Attorney, Agent, or Firm*—Steinberg & Blake

[57] ABSTRACT

A camera which has the capability of photographically recording data. A film guide which guides film for movement in a film plane defines an exposure aperture through which an area of the film is exposed by way of the objective, diaphragm, and shutter of the camera. The exposure aperture has a peripheral region situated in front of a peripheral part of an area of the film which is exposed through the exposure aperture. An indicia-carrying structure carries indicia which is to be photographically recorded and is supported by a supporting structure for movement to a selected one of a plurality of different positions where different indicia carried by the indicia-carrying structure will be selectively located in front of the above peripheral region of the exposure aperture, the indicia-carrying structure responding to travelling of light therethrough for photographically recording on the film in the film plane the indicia positioned in front of the peripheral region of the exposure aperture. A positioning structure is operatively connected with the indicia-carrying structure to selectively position the latter for situating selected indicia in front of the peripheral region of the exposure aperture to be recorded photographically on the film with the same light as that which passes through the objective, diaphragm, and shutter of the camera to expose the film behind the exposure aperture to an image of an object which is to be photographed.

9 Claims, 2 Drawing Figures

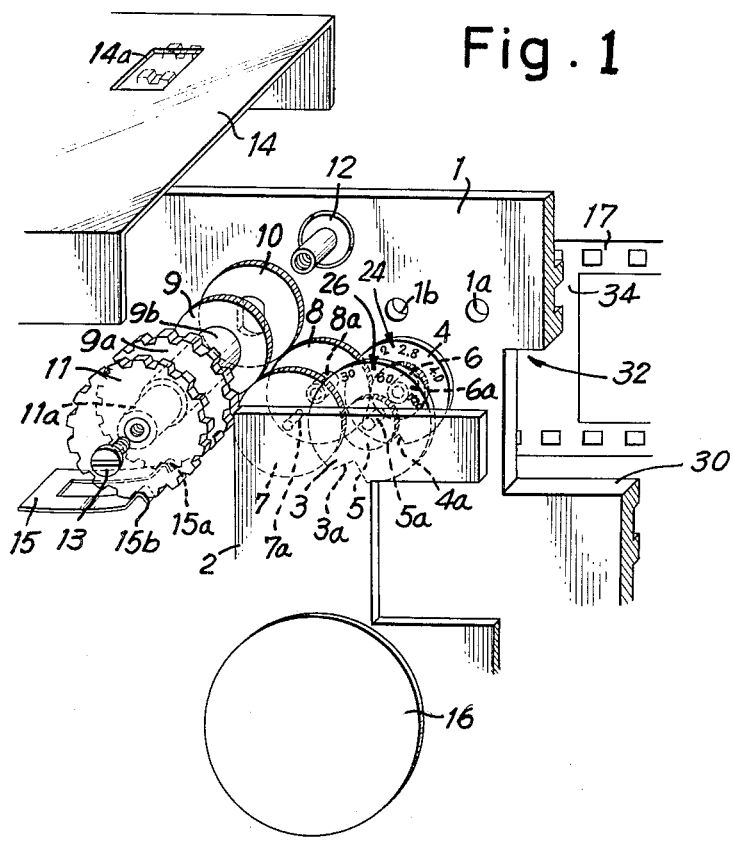

CAMERA WITH DATA-RECORDING STRUCTURE

BACKGROUND OF THE INVENTION

The present invention relates to cameras.

In particular, the present invention relates to cameras which include structure for recording data.

It is already known to provide cameras with data-recording devices according to which an artificial light source in the data-recording device is utilized for focussing on the photosensitive film surface data which is to be photographically recorded. However, the recent developments in photographic cameras are such that these cameras are mechanically complex and extremely compact in dimensions so that with such cameras it is not possible or extremely difficult to accommodate at the cameras conventional data-recording devices which include their own artificial light sources and other components. As a result, it has already been proposed to provide photographic cameras where a completely independent data recording device is externally attached to the camera. For example, such an attachment may be situated at the rear cover or adjacent the lens barrel of the camera. Cameras of this latter type, however, proved to be highly disadvantageous in appearance as well as difficult to maneuver, and the ease of portability thereof is undesirably detracted from as a result of the external projection at the camera necessitated by such an attachment.

With a camera where the data-recording device is mounted at the rear cover, it is, moreover, required to regulate the amount of light utilized for data recording in accordance with the light density of the base material which carries the photographic emulsion inasmuch as the data is recorded from the rear of the film at the side thereof opposite from the photosensitive emulsion. Thus, if the conditions are such that the ASA sensitivity for exposing the data to record the same on the film would otherwise be the same as the ASA sensitivity for photographing a given object on the film, nevertheless different photographing conditions may be required because of the necessity of projecting the image of the data onto the film from the rear side thereof. The same conditions apply with respect to the use of artificial light. It is necessary to regulate the quantity of this light in accordance with the ASA sensitivity of the particular film which is used, even if the data is recorded from the front of the film at the emulsion side thereof, inasmuch as the object to be photographed very likely will utilize natural light whereas the data can only be recorded with the use of artificial light. Thus, under these conditions also it is necessary to provide for recording the data different photographing conditions from those prevailing for photographing a given object.

It has also been proposed to insert into a camera from the exterior thereof a data sheet which becomes situated between a recess formed in part of a guide rail for the film so that the desired data may be focussed on the film surface utilizing natural light. With such a known arrangement, however, the desired data sheet must be inserted from the exterior each time, and these data sheets often are accidentally contacted by the fingers of the operator during exchange of the photosensitive film inasmuch as the data sheets are completely exposed to the exterior.

SUMMARY OF THE INVENTION

It is accordingly a primary object of the present invention to provide a construction which will avoid the above drawbacks.

In particular, it is an object of the present invention to provide a camera with a data-recording structure which provides the capability of utilizing for photographically recording the data the same light which travels through the objective, diaphragm, and shutter of the camera to photograph a given object on film in the camera.

In addition, it is an object of the present invention to provide a data recording device which is situated in a minimum of space in the interior of the camera so that there is no requirement of inserting data sheets with not only the inconvenience caused thereby but also the possibility of contacting the data sheets with the fingers of the operator.

In addition, it is an object of the present invention to provide an exceedingly simple compact structure which can be manipulated by the operator for photographing desired data on the film simultaneously with exposure of the film to an object which is to be photographed.

Thus, it is an object of the present invention to provide a construction which does not require a special projector lens to focus the desired data on the film, which does not require a special light source such as a lamp with its own power source and light-emission control circuit, which does not require any change in the quantity of light for data recording depending upon such factors as the type of film which is used and the ASA sensitivity thereof, and which does not place the data-recording structure in a position where accidental touching thereof might detract in any way from the effective recording of the desired data.

Thus, it is an object of the present invention to provide a construction which is simple, which has components which can be readily assembled, and which does not detract from the appearance or maneuverability of the camera, while at the same time avoiding any external projections at the camera body, while still achieving a clear data image.

In accordance with the invention, the camera includes a film-guide means for guiding the film in a predetermined film plane, this film-guide means defining an exposure aperture through which the film is exposed. This exposure aperture has a peripheral region situated in front of a peripheral part of an area of the film which is exposed through the exposure aperture. An indicia-carrying means carries indicia to be photographically recorded on the film in response to travel of light through the indicia-carrying means to the film, a support means supporting the indicia-carrying means for movement to one of a plurality of positions where different indicia are respectively located in front of the peripheral region of the exposure aperture which is situated in front of a peripheral part of the area of the film which is exposed through the exposure aperture in response to operation of the objective means, diaphragm means, and shutter means of the camera. A positioning means is operatively connected with the indicia-carrying means for situating the latter in the position where selected data will be situated in front of the above peripheral region of the exposure aperture, so that in this way the very same light which is utilized for exposing the film to an object which is to be photographed is also utilized for photographically recording the selected data on the film.

By way of the present invention it is possible to avoid the disadvantages of the prior art with a data recording device which can be incorporated into the camera in such a way that the exterior appearance thereof remains substantially unchanged while data-members carry data such as letters and symbols in a position closely adjacent to the film itself, with operating members for changing the data to be recorded being associated with corresponding portions of the respective data members to provide the desired change in the data which is to be recorded.

BRIEF DESCRIPTION OF DRAWINGS

The invention is illustrated by way of example in the accompanying drawings which form part of this application and in which:

FIG. 1 is a fragmentary exploded partly sectional perspective illustration of one possible embodiment of a structure according to the present invention; and FIG. 2 is a fragmentary sectional plan view of the structure of FIG. 1 in an assembled condition with FIG. 2 showing additional features schematically.

DESCRIPTION OF PREFERRED EMBODIMENTS

Referring now to the drawings, there is fragmentarily illustrated therein a film-guide means 1 in the form of a substantially rigid rail having a rear surface against which the film 17 is pressed by the unillustrated pressure plate which is carried by the rear cover of the camera, as is well known. Thus, the film-guide means 1 guides the film 17 in a conventional manner for movement in the film plane. This film-guide means 1 defines, also in a conventional manner, an exposure aperture 30 through which the film 17 is exposed in a conventional manner by well-known cooperation of the objective means 16, the diaphragm means 20, and the shutter means 22, which are schematically and fragmentarily illustrated in FIG. 2, with the objective means 16 being shown schematically in FIG. 1. This aperture 30 has a peripheral region 32 situated in front of a peripheral part 34 of an area of the film 17 which is exposed through the exposure aperture 30 by operation in a conventional manner of the objective means 16, diaphragm means 20, and shutter means 22. The shutter means 22 includes a shutter cover plate 2 which defines with the film-guide means 1 a gap in which there is accommodated an indicia-carrying means formed in the illustrated example by a pair of rotary discs 3 and 4. These data discs 3 and 4 which form the indicia-carrying means are each in the form of a transparent sheet carrying opaque letters, symbols, or the like, or it is possible for the sheet material forming the discs 3 and 4 to be opaque while the indicia formed by the letters, symbols, and the like are transparent. In the illustrated example the disc 3 is shown schematically in FIG. 1 carrying indicia 26 in the form of numerals indicating exposure time while the disc 4 is indicated in FIG. 1 as carrying indicia 24 which indicate the setting of the diaphragm. The discs 3 and 4 are supported in the manner described below by a support means for turning movement about a common axis with the disc 3 having a diameter greater than the disc 4 so that the indicia 26 of the disc 3 will be situated outwardly beyond the peripheral edge of the smaller disc 4. In this way light travelling through peripheral regions of the discs 3 and 4 toward the film 17 will be capable of transmitting thereto images both of the indicia 24 and the indicia 26.

The support means described below supports the indicia-carrying means 3, 4 in such a way that selected indicia thereof will be situated in front of the upper left corner region of the exposure aperture 30, as viewed in FIG. 1, this corner region of the aperture forming the peripheral region 32 thereof in front of which it is possible in this way to locate in accordance with the selection of the operator selected items of the indicia 24 and 26 to be recorded photographically on the film 17.

The support means which supports the indicia-carrying means 3, 4 includes a rotary gear 5 to which the disc 3 is secured and a rotary gear 6 to which the disc 4 is secured. The disc 4 is formed with a central aperture through which a shaft 5a of the gear 5 extends, this shaft 5a also extending into an axial bore which is formed in a rearwardly directed shaft 6a which is integral with and extends rearwardly from the gear 6. This hollow shaft portion 6a is supported for rotary movement in a suitable opening 1a in the film-guide means 1, so that in this way the parts 5, 6 are capable of being independently rotated about their common axis for supporting the indicia-carrying discs 3 and 4 respectively for independent rotation about their common axis.

A positioning means is provided for positioning selected indicia of the discs 3 and 4 in front of the peripheral region 32 of the exposure aperture 30. This positioning means includes a pair of coaxial rotary gears 7 and 8 which respectively mesh with the gears 5 and 6. The gear 7 has integrally formed therewith a rearwardly extending shaft 7a received in an axial bore formed in a rearwardly extending shaft 8a which is integral with the gear 8, this shaft 8a being in turn supported for rotary movement in an opening 1b which is formed in the film-guide means 1. Thus, the gears 7 and 8 of the positioning means are each turnable about their common axis independently of the other. The positioning means further includes coaxial rotary gears 9 and 10 which respectively mesh with the gears 7 and 8. The gear 9 is integral with a coaxial manually turnable member 9a, the unit 9, 9a being axially bored to receive the rearwardly extending hollow shaft portion 11a of a second manually turnable member 11. This member 11 is axially bored so as to receive a supporting pin 12 on which the member 11 is turnable, being retained thereon by a screw 13 as illustrated in FIGS. 1 and 2. This screw 13 is of course threaded into a suitable threaded bore formed in the front region of the pin 12 which is fixedly carried by the film-guide means 1 in the manner most clearly shown in FIG. 2. At its portion which extends rearwardly beyond the gear 9, the shaft 11a terminates in a non-circular region received in a corresponding non-circular central opening of the gear 10. Thus the gear 10 is fixed by way of this non-circular portion of the shaft 11a to the manually turnable member 11. It is thus clear that by manually turning member 11 the operator will rotate the gear 10 while the gear 9 can remain stationary, and through the gear 8 the rotary movement of the gear 10 will be transmitted to the gear 6 for changing the angular position of the disc 4. In the same way, if the operator turns the member 9a, the gear 9 will turn independently of the gear 10, thus bringing about independent turning movement of the shaft 7 and through the latter of the gear 5 which carries the disc 3. Thus through these simple gear trains which occupy an exceedingly small space it is possible for the operator manually to determine the angular positions of the discs 3 and 4 and thus it is possible for the operator to select angular positions for the discs 3 and 4 which will situate selected items of the indicia 24 and 26 in front of the peripheral region 32 of the exposure aperture 30.

The axial region 9b of the unit 9, 9a which is axially bored to receive the hollow shaft 11a is indicated in FIG. 1.

The camera body has an upper wall portion or cover 14 formed with an opening 14a through which peripheral portions of the members 9a and 11 are accessible. These peripheral portions of the manually turnable members 9a and 11 are toothed, as indicated most clearly in FIG. 1, so as to have peripheral projections, and the outer surfaces of these peripheral projections carry indicia matching the indicia carried by the indicia-carrying means 3, 4. Thus, the uppermost projections at the peripheries of the members 9a and 11 are accessible through the opening 14a while light-tightness of the interior of the camera is maintained in a well known manner. The outer surfaces of these projections at the peripheries of the members 9a and 11 carry the indicia matching that of the discs 3 and 4 in such a way that the uppermost projection will render visible at the opening 14a an item of indicia matching that which is located at any given instant in front of the peripheral region 32 of the aperture 30. If, for example, it is assumed that in the position of the parts illustrated in FIG. 1 the diaphragm setting 4.0 and the exposure time setting 125 are situated in front of the peripheral region 32 of aperture 30, then the uppermost projection of member 9a carries the item of indicia 125 while the uppermost projection of the member 11 carries the item of indicia 4.0, so that through this arrangement the operator will be able to view at the opening 14a the indicia selected for photographic recording on the film 17. Thus, through this arrangement, whichever items of indicia appear at the window 14a match those items of indicia of the discs 3 and 4 which are situated in front of the peripheral region 32 of aperture 30. In this way it is possible for the operator simply to turn one or both of the members 9a and 11 in order to place selected indicia in a location to be photographically recorded.

In order to releasably maintain the parts in their adjusted positions, a leaf spring 15 fixedly carried at its left end region, as viewed in FIG. 1, by any suitable structure, presses yieldably at its right end region 15b against the members 9a and 11. It will be seen that this free end portion 15b of the spring 15 is suitably curved to enter into the space between a pair of projections at the peripheries of each member 9a and 11, this spring 15 thus forming a releasable detent for releasably holding the structure in the selected data-indicating position. Thus, by way of the U-shaped free end region of the spring 15 it is possible to provide a click structure which will accurately position the parts so that selected data will be photographically recorded.

According to a further feature of the invention, the disc 3 is formed with a notch 3a adapted to be situated in one position of the disc 3 in alignment with the corner region 32 of the aperture 30 so that when the disc 3 is positioned in this manner none of the data on the disc 3 will be in a position to be photographically recorded. In the same way, the disc 4 is provided with a notch 4a adapted also to be aligned with the corner region 32 of the aperture 30 so that when the disc 4 is in this particular position none of the data carried by the disc 4 will be photographically recorded. Of course, the elements 9a and 11 may be manually turned to situate either one or both of the notches 3a and 4a in this position where the data of the discs 3 and 4 will not be positioned for photographic recording. As a result of this feature it is possible either to record no data on the film or to record only the data carried by one of the discs on the film. One of the projections at each of the members 9a and 11 may be blank for indicating when the discs 3 and 4 have been positioned so as to selectively situate the notches 3a and/or 4a in alignment with the corner region 32 of aperture 30.

Thus, with the above-described structure of the invention once the selected data has been set for photographic recording by external manual operation of dials 9a and 11, the photographing light which passes through the objective means 16, the diaphragm means 20, and the shutter means 22 in connection with photographing an object at the film 17 also travels through the indicia-carrying means 3, 4 so that the selected data will also be photographically recorded at all times with an appropriate exposure in accordance with the quantity of light and in accordance with the camera settings made taking into consideration such factors as the type of film and the ASA sensitivity which have been preset for making proper exposures.

Although not illustrated, a data-display member carrying the letters, symbols, and the like identical to those which are photographically recorded at a corner part of the area of the film which is exposed may be provided within the viewfinder field in operative association with the external operating dials 9a and 11, in such a way that the particular data which is photographically recorded will be visually seen also in the field of the viewfinder during operation of the camera, thus confirming for the operator when looking into the viewfinder the particular data which will be recorded photographically on the film.

When the structure of the invention is utilized with a camera having a focal plane shutter, it is preferred for improvement of the shutter efficiency that the shutter curtains which include the leading and trailing curtains are situated as closely as possible to the film in view of the characteristics peculiar to this particular type of shutter. However, inasmuch as these shutter curtains require a thickness of approximately 3 mm or more in this case, and, as a result, should be spaced from the photosensitive film surface by a distance on the order of 5–6 mm, with an arrangement where the data discs 3, 4 are located in front of the shutter curtains, at the side thereof where the objective is situated, it cannot be expected that a clear data image will be available for photographic recording. This problem is solved, however, by a construction as shown where the shutter cover plate is situated directly behind the shutter curtains but spaced slightly in front of the film-guiding rail-plate 1 so as to define therewith the gap in which the data disc 3 and 4 and the structure associated therewith can be accommodated as illustrated. In this way any possible mutual mechanical interference between the data discs 3 and 4 and the shutter curtains is reliably avoided while at the same time assuring a clear data image to be obtained at all times by appropriate exposure as required for exposing at the film an object which is to be photographed.

It is clear from the above description as well as from the drawings that according to the present invention wherein the data discs are situated immediately in front of the film it is possible to achieve many advantages as compared to previously known devices designed to achieve the same results. Thus, with the structure of the invention it is not required to provide a special projector lens to focus an image of the desired data on the photosensitive film surface. Also with the structure of the present invention there is no requirement of a light-emitting means which includes elements such as a power source, a light-emission control circuit, and a lamp. Furthermore, there is no requirement to change the quantity of light utilized for data recording depending upon factors such as the type of film used and the ASA sensitivity. Finally, there is no requirement of exchanging data sheets, particularly since with the disclosed construction there is rarely if ever any possible danger of accidentally touching the data sheets 3 and 4 during exchange of film.

Moreover it is clear that the device of the invention has additional advantages such as the simplicity of the construction thereof, the ease with which the components are assembled, the good exterior appearance of the camera which is maintained, as well as the ease of maneuverability thereof due to the fact that there are no external projections required at the exterior of the camera body in order to accommodate the data-recording structure. In addition, a clear data image is assured with the structure of the invention.

What is claimed is:

1. In a camera, film-guide means for guiding film for movement in a predetermined film plane and defining an exposure aperture through which film in the film plane is exposed, said aperture having a peripheral region situated in front of a peripheral part of an area of a film strip which is exposed through said exposure aperture, indicia-carrying means situated adjacent said film-guide means and carrying indicia to be photographically recorded on a film strip in response to light travelling through said indicia-carrying means to film in said film plane, support means supporting said indicia-carrying means for movement to a selected one of a plurality of different possible positions in which different items of indicia are respectively situated closely adjacent to said aperture in front of said peripheral region thereof, the camera including an objective means, diaphragm means, and shutter means all operative to expose film in said film plane behind said aperture while also providing during exposure of film light which travels through said indicia-carrying means for photographically recording on the film at least one selected item of indicia in accordance with the selected one of said positions of said indicia-carrying means, and positioning means operatively connected with said indicia-carrying means for positioning the latter in a selected one of said plurality of positions, whereby when film in said film plane is exposed by way of said objective means, diaphragm means, and shutter means, at least one selected item of indicia will be photographically recorded on the film strip with the same light that travels through the objective means, diaphragm means, and shutter means to expose the film in the film plane to an image of a given object which is to be photographed, said indicia-carrying means including a pair of coaxial discs supported for rotation about their common axis, respectively situated in parallel planes which are parallel to said film plane, and respectively having peripheral edge regions situated in front of said peripheral region of said aperture, one of said discs having a diameter greater than the other and having its peripheral edge region situated outwardly beyond the peripheral edge region of the other disc, while carrying one set of indicia beyond the peripheral edge region of said other disc, the latter carrying a second set of indicia to be selectively positioned in front of said peripheral region of said aperture, and said positioning means being operatively connected with said discs for turning the latter independently of each other about their common axis so that a selected item of indicia of one disc and a selected item of indicia of the other disc can be positioned to be photographically recorded on the film.

2. The combination of claim 1 and wherein said positioning means is manually operable and is in part accessible at the exterior of the camera.

3. The combination of claim 1 and including indicating means cooperating with said indicia-carrying means for indicating to the camera operator that part of the indicia carried by said indicia-carrying means which is positioned to be photographically recorded.

4. The combination of claim 3 and wherein said positioning means is manually operable and is in part accessible at the exterior of the camera.

5. The combination of claim 4 and wherein said indicating means is formed by a surface portion of said positioning means which is visible at the exterior of the camera and which carries indicia matching that carried by said indicia-carrying means, said positioning means positioning a given item of the indicia carried thereby at a predetermined location visible at the exterior of the camera when the same item of indicia carried by said indicia-carrying means is positioned to be photographically recorded.

6. The combination of claim 1 and wherein said indicia-carrying means has at least one additional position where no indicia is in a position to be photographically recorded, and said positioning means being operatively connected with said indicia-carrying means for selectively locating the latter also in said additional position thereof.

7. The combination of claim 1 and wherein said positioning means includes a pair of independent gear trains operatively connected with said discs for independently rotating the latter about their common axis, said gear trains respectively terminating in a pair of manually turnable members accessible at the exterior of the camera to be manually turned by the operator for locating selected indicia of said discs in front of said peripheral region of said aperture.

8. The combination of claim 7 and wherein the camera includes an exterior wall portion formed with an opening through which said manually turnable members project to be accessible to the operator, and said manually turnable members carrying at surfaces thereof which are visible at the exterior of said camera at said opening of said wall portion thereof indicia matching that carried by said discs and said positioning means positioning said discs to locate in front of said peripheral region of said aperture indicia which matches that visible at the opening of said exterior wall portion of the camera at the surfaces of said manually operable members, for indicating to the operator the indicia positioned to be photographically recorded.

9. The combination of claim 8 and wherein said discs are respectively formed with peripheral notches to be positioned in front of said peripheral region of said exposure aperture when no indicia is to be photographically recorded, so that said positioning means can be manipulated to record either no indicia or indicia carried by only one of said discs.

* * * * *